2,937,936

SOIL FUMIGANT COMPRISING 1,2-DIBROMO-3-CHLOROPROPANE

Carl T. Schmidt, Honolulu, Hawaii, assignor to Pineapple Research Institute of Hawaii, Honolulu, Hawaii, an association No Drawing. Filed Oct. 27, 1954, Ser. No. 465,121

4 Claims. (Cl. 71—2.7)

The present invention relates to the fumigation of soil or other growth substrates for plants, and particularly to a method of altering the naturally occurring biological constituents of such soil or substrates to control certain deleterious biological factors and coordinately to provide for the promotion of micro-constituents favorable to plant or crop production.

Previous proposals in the art of partial sterilization of soil by means of the application of chemicals to the soil to act as fumigants have been found to vary among themselves in degree of effectiveness. Efforts along these lines have been directed toward the control of some known noxious biological factor such as insects, nematodes, symphylids, fungi or bacteria, which have met with some degree of success. However, it is known that if a fumigant chemical agent is added to the soil the result may be mortality for some forms whereas others flourish because of the change in the biological competitive factors operating in the environment. Further, it has been found that in the vast complexity of organisms comprising the biological complex of the soil that certain kinds or species have the capability of sequestering certain nutrient elements so completely that none remains free in the soil to be utilized by other organisms, either plant or animal. A gross chemical analysis of soil invariably shows the presence of these so-called minor elements essential to the survival of plant life but actually it is biologically bound in the bodies of micro-organisms in such a manner as to exclude it in such completion from plants and other organisms with lesser aggressive ability that starvation and resultant malnutrition effects and symptoms appear. Such minor element deficiencies associated with biological competition for nutrient elements found in soil act to seriously reduce the vigor of plants grown thereon and resultant losses to agricultural crops reach a great order of magnitude.

A further factor in crop reduction results from the presence of certain soil organisms such as insects and their larvae, nematode worms, parasitic fungi and bacteria which in actual destruction of the root systems of plants remove the means by which plants draw the nutrients from the soil. Destruction or removal of such organisms reflects in improved growth status of the affected plants.

The foregoing discussion emphasizes the multiplicity of factors which may operate singly or in combination or in competition in a soil mass. The study of their inter-relationships becomes a fantastically complicated problem not capable of solution with presently known methods. In view of all of these considerations the only reliable method of evaluating the validity of any method of soil improvement must be the summation of all of these factors which is shown in rate of growth, size of plant, or yield of desirable portions of plants.

I have found that if the chemical 1,2-dibromo-3-chloropropane (also known as 1-chloro-2,3-dibromopropane and as BBC) is injected into the soil it diffuses among the soil particles and there is a reduction of nematodes such as the root-knot nematode (*Heterodera marioni*) and others and that insects coming in contact with the fumigant vapors are destroyed. In the case of pineapple this has resulted in larger, more vigorous plants with significantly larger fruits.

I have also found that the use of 1,2-dibromo-3-chloropropane has resulted in changing the chemical composition of pineapple plants favorably under circumstances where macro- or microorganisms could not be attributed to be the primary cause of plant failure.

Materials are known to the art of soil fumigation such as mixtures of 1,2-dichloropropane and 1,3-dichloropropene (D-D mixture of trade) which are remarkably efficient and have long since become standard practice in the production of certain crops such as vegetables, tobacco and pineapple. I have found that 1,2-dibromo-3-chloropropane differs in that the sum of its activity results in material growth increases over and above that obtained with the materials now known and used in agricultural soil fumigation practices.

I have found a further advantage resulting from the use of 1,2-dibromo-3-chloropropane to be at least a tenfold reduction in the quantity of material required. This quantitative difference in required amounts has advantages in reducing the amount of transportation and handling equipment. Another advantage is that the selection of a proper diluent with lubricating properties reduces the wear and failure of metering pumps and application equipment and machinery. Rapid and excessive wear of metering pumps results in improper application, which in turn results in reduced effectiveness. The scouring properties of fumigant liquids are notable in increasing the difficulties of accurately metering the materials.

Another beneficial quality of 1,2-dibromo-3-chloropropane resides in its property of permitting application a considerable period before planting, thereby reducing interference with plantation operations when fields are being started. This also enables the biological complex to come to a favorable equilibrium prior to the time when root systems are becoming established.

I have found that 1,2-dibromo-3-chloropropane lends itself to all of the commonly accepted application practices. It may be applied directly, it may be diluted with volatile solvents such as gasoline, kerosene, diesel oil and paint thinners from the petroleum industry, it may be absorbed on clay earths such as bentonites or pyrophyllite and applied as a solid, it may be emulsified with a number of common emulsifying agents such as Triton B–1956 or 2–7–R and applied as a dispersion in water. All of these versatile considerations permit great latitude in the selection of methods for application under particular diverse conditions of agricultural practices.

The material 1,2-dibromo-3-chloropropane has the empirical chemical formula $C_3H_5Br_2Cl$ and the structural formula $CH_2Br-CHBr-CH_2Cl$. It boils at 200° C. at 760 mm. Hg and has a density of 2.085 25/25° C. It is not offensive nor peculiarly dangerous to operators using it. It remains diluted in most solvents at normal prevailing temperatures. It is non-explosive and does not burn.

The following examples illustrate but do not limit the claims of the invention.

EXAMPLE I

The material 1,2-dibromo-3-chloropropane was dissolved in a petroleum paint thinner which boils to completion at 200° F. The mixture was composed of one part 1,2-dibromo-3-chloropropane and nine parts of petroleum thinner. This mixture in the amount of 9 ml. per unit injection was injected into soil of good tilth and moisture content with a mulch paper cover to a depth of six inches by means of a Maclean fumigun at spaced intervals of twelve inches, which is common to pineapple planting practice. The injection hole was covered with soil and three weeks later pineapple slips were planted at the points at which the injections had been made. Plots of similar size were treated with D-D mixture at the rate of 400 lbs. per acre and untreated check plots were also a part of the experiment. Subsequent fertilizer practices, iron sulfate sprays, weeding, and insecticidal sprays were common to all plots. The purpose of the D-D mixture plots was to determine whether 1,2-dibromo-3-chloropropane possessed any properties not common to the art of what had been known to be the best of soil fumigation practice. Two years later the matured, ripened fruits were weighed and the plants were stripped to a single sucker per plant. These suckers developed ratoon fruits which were harvested on the third year. The results of this initial experiment are found in Table 1.

Table 1.—Average fruit weights from pineapple plants grown in soil treated with 1,2-dibromo-3-chloropropane and D-D mixture

| Material | Plant Crop, lbs. | Ratoon Crop, lbs. |
| --- | --- | --- |
| 1,2-dibromo-3-chloropropane | 4.44 | 3.41 |
| D-D mixture | 4.00 | 3.41 |
| Check | 3.05 | 3.15 |

It is seen that the plant crop superiority of fruits from 1,2-dibromo-3-chloropropane plots is very considerable both over the untreated soil as well as that over the D-D mixture soil treatment. Since planters depend to a high degree on the quality of plant crop fruit for their profitable operation this increment is exceedingly important.

EXAMPLE II

In a similar manner to that described in Example I, except that diesel oil was used as the diluent for 1,2-dibromo-3-chloropropane, two experiments were set up on the island of Kauai. In these the results are only available for plant crop pineapple fruit weights. The results are shown in Table 2.

Table 2.—Average plant crop fruit weights from pineapple plants grown in soil treated with 1,2-dibromo-3-chloropropane on the island of Kauai

| Material | Field 1, lbs. | Field 2, lbs. |
| --- | --- | --- |
| 1,2-dibromo-3-chloropropane | 4.24 | 4.52 |
| D-D mixture | 4.05 | 3.67 |
| Untreated check | 3.32 | 2.50 |

The inherent superior qualities of this new invention are again shown in the increased fruit weight. D-D mixture is exceedingly effective as a nematocide and a partial soil sterilizing agent but the inherent qualities of this new invention exceed these as will be developed in following illustrations.

EXAMPLE III

A trial was set up as in Example II wherein soil was injected with 1,2-dibromo-3-chloropropane dissolved in diesel oil on the island of Molokai. In this trial the quantity of active material varied, being 2, 3, 4 and 6 gallons per acre with D-D mixture applied at the rate of 20, 40, and 60 gallons per acre with an untreated check. Plant response was measured by growth increase in the weight of longest leaf of the plant during a three month growth period. The results are presented in Table 3.

Table 3.—Percentage increase in average weight of longest leaf of pineapple plants during a three month interval

| Material | Gal./a. | Percentage increase |
| --- | --- | --- |
| 1,2-dibromo-3-chloropropane | 2 | 142.7 |
| Do | 3 | 181.9 |
| Do | 4 | 166.1 |
| Do | 6 | 175.7 |
| D-D mixture | 20 | 143.1 |
| Do | 40 | 145.9 |
| Do | 60 | 131.2 |
| Untreated check | | 78.3 |

Here again it is seen that the qualities of 1,2-dibromo-3-chloropropane are such that it influences the rate of growth of plants, and moreover that this rate of increase is very significantly superior to that produced by a hitherto commonly acknowledged good partial sterilizing agent.

EXAMPLE IV

Two trials were set up in two different fields on the island of Oahu wherein the dosages of 1,2-dibromo-3-chloropropane were applied with a diesel oil diluent at the rates of 2, 3, 4 and 6 gallons of active material per acre with an untreated check. The results were expressed as average weight (in grams) and length and width (in cm.) of longest leaf of pineapple plants. These results appear in Table 4.

Table 4.—Average weight, length and width of longest leaf of pineapple plants grown in soil treated with varying amounts of 1,2-dibromo-3-chloropropane

| Material | Dosage, gal./a. | Field 1 | | | Field 2 | | |
| --- | --- | --- | --- | --- | --- | --- | --- |
| | | Weight (gm.) | Length (cm.) | Width (cm.) | Weight (gm.) | Length (cm.) | Width (cm.) |
| 1,2-dibromo-3-chloropropane | 2 | 43.9 | 66.9 | 5.2 | 70.7 | 88.4 | 6.5 |
| Do | 3 | 42.6 | 66.4 | 5.2 | 74.5 | 87.9 | 7.0 |
| Do | 4 | 40.5 | 65.0 | 5.0 | 75.8 | 89.4 | 7.0 |
| Do | 6 | 37.7 | 63.5 | 4.7 | 73.9 | 88.5 | 6.9 |
| Untreated check | 0 | 34.3 | 61.0 | 4.8 | 55.2 | 81.7 | 5.6 |

The number of leaves of a pineapple plant tends to be a fairly constant value for any particular growing area and along with the obvious improvement in size of leaf resulting from treatment with 1,2-dibromo-3-chloropropane, the wider leaf is reflected in larger stump which contains stored nutrients which are utilized by the plant at time of fruiting.

EXAMPLE V

To demonstrate that the growth increases in pineapple are not merely an expression of quantity but also of quality, leaf samples were drawn from plots which had been treated before planting with 1,2-dibromo-3-chloropropane at the rate of 4 gallons per acre and compared with untreated samples for their constituent chemical composition determined by quantitative analysis. These results appear in Table 5.

Table 5.—Results of chemical analysis for chemical constituents of pineapple leaves grown in plots treated with 1,2-dibromo-3-chloropropane

| Age of Plant | Treated | | | | | | | Untreated | | | | | | |
|---|---|---|---|---|---|---|---|---|---|---|---|---|---|---|
| | Percent Ca | Percent Mg | Percent P | Percent K | B, p.p.m. | Percent Mn | Cu, p.p.m. | Percent Ca | Percent Mg | Percent P | Percent K | B, p.p.m. | Percent Mn | Cu, p.p.m. |
| 1 year | .020 | .025 | .018 | .344 | 11 | .049 | 12.5 | .022 | .024 | .017 | .308 | 11 | .041 | 9.9 |
| Fruiting | .023 | .008 | .018 | .375 | 14 | .168 | 5.3 | .010 | .004 | .014 | .392 | 8 | .103 | 3.2 |

From these data it can be seen that the utilization of mineral elements is varied as a result of treatment with 1,2-dibromo-3-chloropropane. Unaffected are phosphorus (P) and potassium (K). Calcium (Ca), magnesium (Mg), boron (B), and copper (Cu) are increased in the older plants as a result of treatment. Copper (Cu) is increased in both young and old plants.

EXAMPLE VI

The soil around plants in growing fields may also be treated with 1,2-dibromo-3-chloropropane. In one such instance a 10 percent, by volume, solution of 1,2-dibromo-3-chloropropane in a petroleum paint thinner diluent was injected into the soil at the rate of 40 gallons per acre in the walk space in pineapple rows, eight inches from the plants. This was done after plant crop harvest. The fruits from the treated plots had an average weight of 6.23 pounds whereas the untreated check fruits had an average weight of only 5.95 pounds. In another post-planting treatment where injections were similarly made except that diesel oil was used as diluent, the treated plants are growing vigorously and show promise of producing fruits of superior size and quality.

From the foregoing disclosure it will be apparent that this invention provides a novel method of treating soil by fumigation which operates to produce marked increases in plant yields by creating a growing medium with characteristics enabling the plant to utilize nutrient elements made available more readily as a result of the treatment. Further, the method, over and above the benefits of efficiency derived directly, also provides for a reduction in quantity and cost of material required as well as being safe and convenient in its operation.

The invention has been described in detail for the purpose of illustration but it will be obvious that numerous modifications and variations may be resorted to without departing from the spirit of the invention as set forth in the accompanying claims.

I claim:
1. A method of treating soil to improve its plant growing properties comprising introducing into said soil a concentration of 1,2-dibromo-3-chloropropane effective to improve said properties, said 1,2-dibromo-3-chloropropane being absorbed in absorbent clays for introduction into the soil essentially as a solid.

2. A method of treating soil to improve its plant growing properties, which comprises applying an effective amount of 1,2-dibromo-3-chloropropane to said soil before planting.

3. A method of treating soil to improve its plant growing properties, which comprises applying an effective amount of 1,2-dibromo-3-chloropropane to said soil after planting.

4. A method of treating soil to improve its plant growing properties comprising introducing into said soil a concentration of 1,2-dibromo-3-chloropropane effective to improve said properties.

References Cited in the file of this patent

UNITED STATES PATENTS

| 2,421,507 | Jones | June 3, 1947 |
| 2,596,929 | Kagy | May 13, 1952 |

FOREIGN PATENTS

| 920,161 | France | Jan. 2, 1947 |

OTHER REFERENCES

King: "U.S. Dept. of Agriculture Handbook," May 1954, pp. 4–9; No. 69, p. 278.

Frear: "Chemistry of Insecticides, Fungicides, and Herbicides," 2nd ed., 1948, pp. 189–193; "Catalogue of Insecticides and Fungicides," vol. 1, 1947, pp. 160, 161.

Bolock, in "Journal of Economic Entomology," vol. 44, No. 5, October 1951, pp. 657–659.

Jurinak, in "Agricultural and Food Chemistry," vol. 5, No. 8, August 1957, pp. 598–601 (footnote on p. 601 referring to a 1952 publication is especially pertinent).

Beilstein's Handbuch der Organischem Chemie," 4th ed. (1918), vol. 1, p. 111.